United States Patent Office

2,873,506
Patented Feb. 17, 1959

2,873,506

TREATMENT OF LOW LOSS CERAMIC MATERIALS

Harold Rawson, Rugby, and Jean Eleanor Jamieson Dods, Clifton-upon-Dunsmore, England, assignors to The British Thomson-Houston Company Limited, a British company No Drawing. Application August 16, 1954
Serial No. 450,254

Claims priority, application Great Britain August 24, 1953

2 Claims. (Cl. 25—157)

This invention relates to the heat treatment of ceramic materials whereby to improve their electrical properties and more especially to reduce the power factor (tan $\delta$) of the materials.

It is becoming desirable to produce ceramic materials having a power factor of .0005 or less particularly for use in circuits operating at ultra high frequencies. Many ceramic materials exist the power factors of which lie above this value and we have found that by suitable heat treatment certain of these materials may have their power factors considerably reduced.

According to the invention a ceramic which has been produced by firing of its constituents is subsequently heated for a prolonged period at a temperature below the firing temperature, whereby to effect a reduction in the power factor of the material.

The ceramic materials which have been found to respond favourably (as to power factor reduction) to this treatment all contain alumina; with the alumina are associated varying percentages of other materials which when fired in intimate mixture with alumina result in the formation of a ceramic material. Such other materials are magnesium oxide, silica calcium carbonate and barium carbonate.

The accompanying Table I gives the composition, wherein the ingredients are expressed on a parts per unit weight base, of a number of ceramic materials which exhibit the favourable reduction in power factor after the prolonged heating of the invention:

*Table I*

| Ceramic | Kaolin | Talc | MgO | SiO$_2$ | CaCO$_3$ | BaCO$_3$ | Total |
|---|---|---|---|---|---|---|---|
| A | 14.78 | 49.7 | 21.17 |  | 14.35 |  | 100.00 |
| B | 14.16 | 47.9 | 34.02 |  |  |  | 100.00 |
| C | 14.16 | 47.9 |  |  |  | 3.02 | 100.00 |
| D | 14.14 | 47.86 | 26.12 |  |  | 11.82 | 100.00 |
| E | 3.64 | 81.00 | 30.05 |  |  | 7.95 | 100.00 |
| F | 3.70 | 82.60 | 5.74 |  |  | 9.62 | 100.00 |
| G | 3.86 | 83.55 | 4.20 |  |  | 9.50 | 100.00 |
| H | 3.74 | 84.46 | 3.44 |  |  | 9.15 | 100.00 |
| J | 3.90 | 86.80 | 2.45 |  |  | 9.35 | 100.00 |
| K | 15.60 | 62.4 |  |  |  | 9.30 | 100.00 |
| L | 15.5 |  | 3.70 | 29.5 | 47.2 | 18.30 | 100.00 |
| M | 24.8 |  |  | 27.5 | 29.4 | 7.8 | 100.00 |
|  |  |  |  |  |  | 8.3 |  |

The prolonged period of heating should last for not less than 20 hours, a progressive improvement in power factor taking place as the period of heating is extended. The temperature at which the heating is effected is at least 850° C. depending on the ceramic and may be as high as 1300° C. which is below the temperature at which the firing of the ceramic during its manufacture takes place. The temperature at which heating is effected and its duration should be such that the value of the power factor of the material under treatment is reduced by at least 10%.

The accompanying Table II gives the improvement in power factor obtained by the prolonged heating of the invention: the symbols used in the first column of Table II correspond with the symbols used to denote the compositions recorded in Table I:

*Table II*

| Ceramic | Batch No. | Before heat treatment | | After 60 hrs. at 1,000° C. | |
|---|---|---|---|---|---|
|  |  | K | Tan $\delta$ | K | Tan $\delta$ |
| Experimental materials: |  |  |  |  |  |
| A |  | 6.8 | 0.0006 | 6.8 | 0.0004 |
| B |  | 6.1 | 0.0004 | 6.2 | 0.00009 |
| C |  | 6.6 | 0.0007 | 6.6 | 0.001 |
| D | 1 | 6.2 | 0.0005 | 5.6 | 0.0001 |
|  | 11 |  |  | 6.9 | 0.00008 |
| E |  | 6.3 | 0.0007 | 6.1 | 0.0002 |
| F |  | 6.3 | 0.001 | 6.2 | 0.0004 |
| G |  | 5.4 | 0.001 | 5.6 | 0.0003 |
| H |  | 5.4 | 0.002 | 5.0 | 0.0002 |
| J |  | 6.0 | 0.002 | 6.0 | 0.0004 |
| K | 1 | 5.8 | 0.0004 | 5.8 | 0.0002 |
|  | 11 | 6.1 | 0.0002 | 6.1 | 0.0002 |
| L |  | 5.8 | 0.001 | 6.7 | 0.0006 |
| M |  | 6.8 | 0.0002 | 6.3 | 0.0009 |

This table also indicates an improvement in dielectric constant (K) of the materials which, with two exceptions, is obtained by the heat treatment of the invention.

In addition we have treated the commercial materials identified in Table III with the results given in that table. These materials contain more than 90% of alumina. All tests were made at a wave length of 10 cm.

*Table III*

| Material | Before treatment | | 1,300° C. for 60 hrs. | | 1,200° C. for 60 hrs. | | 1,100° C. for 60 hrs. | |
|---|---|---|---|---|---|---|---|---|
|  | K | Tan $\delta$ | K | Tan $\delta$ | K | Tan $\delta$ | K | Tan $\delta$ |
| Sintox | 8.7 | 0.0006 | 8.7 | 0.0005 | 8.3 | 0.0004 | 8.3 | 0.0004 |
| Recrystallised alumina | 8.3 | 0.0002 | 8.3 | 0.0002 | 8.6 | 0.0001 | 8.6 | 0.00006 |
| Hylumina | 8.9 | 0.0016 | 8.9 | 0.0004 | 8.8 | 0.0004 | 8.8 | 0.0005 |
| Triangle RR | 7.7 | 0.0005 | 7.7 | 0.0003 | 7.5 | 0.0002 | 7.5 | 0.0001 |

"Sintox" is an alumina ceramic manufactured by Lodge Plugs Ltd. of Rugby, England.

"Recrystallised Alumina" is prepared by The Thermal Syndicate Ltd. of Wallsend, Northumberland, England.

"Hylumina" is prepared by K. L. G. Sparking Plugs Ltd. of Cricklewood Works, London, N. W. 2, England.

"Triangle RR" is a substantially pure alumina ceramic manufactured by The Morgan Crucible Works Ltd. Battersea, London, S. W. 11, England.

It will be noted that prolonged heating at the higher temperature of 1300° C. of the alumina type material generally results in little improvement in power factor, treatment at the lower temperatures producing the better results.

We believe that the improvement in the electrical properties of the ceramic materials obtained by the treatment of the invention results from devitrification of the glassy phase in the ceramic material and to a reduction in the number of lattice defects in the crystals of the material.

The results exhibited by Table II appear to support this surmise since, if the heat treatment is not suitably chosen, the amount of glassy phase and the number of lattice defects can increase with a resulting increase in power factor as exhibited by materials C and M.

We have successfully treated ceramics having a major content of alumina, magnesium oxide and silica in the proportions by weight in the range alumina 1–10%, magnesium oxide 30–60% and silica 40–70% at a temperature of between 850 and 1100° C. in an oxidizing atmosphere for a prolonged period with a marked improvement in the power factor. We have also been successful in treating ceramics having a major content of alumina, calcium oxide and silica in the proportions, by weight, in the range alumina 10–25%, calcium oxide 35–48% and silica 45–55% at a temperature of between 800 and 950° C. for a period of at least twenty hours in an oxidizing atmosphere.

What we claim as new and desire to secure by Letters Patent of the United States is:

1. The method of improving the power factor of a fired ceramic material consisting of a major content of $Al_2O_3$, MgO and $SiO_2$ in the proportions by weight of 1–10%, 30–60%, 40–70% respectively, which consists in subjecting the material, after firing, to heating at a temperature of between 850–1100° C. for a period of at least 20 hours in an oxidising atmosphere.

2. The method of improving the power factor of a fired ceramic material having a major content of $Al_2O_3$, CaO and $SiO_2$ in the proportions, by weight, of 10–25%, 35–48%, 45–55% respectively, which consists in subjecting the material, after firing, to heating at a temperature of between 800–950° C. for a period of at least 20 hours in an oxidising atmosphere.

References Cited in the file of this patent
FOREIGN PATENTS 115,469    Australia _____ Dec. 28, 1940